US012308030B2

(12) United States Patent
Bay et al.

(10) Patent No.: US 12,308,030 B2
(45) Date of Patent: *May 20, 2025

(54) CATEGORIZING AUDIO TRANSCRIPTIONS (71) Applicant: Wells Fargo Bank, N.A., San Francisco, CA (US)

(72) Inventors: Yong Yi Bay, Normal, IL (US); Yang Angelina Yang, Mountain View, CA (US); Menglin Cao, Danville, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,545

(22) Filed: Feb. 6, 2024

(65) Prior Publication Data
US 2024/0177714 A1    May 30, 2024

Related U.S. Application Data (63) Continuation of application No. 17/158,805, filed on Jan. 26, 2021, now Pat. No. 11,922,943.

(51) Int. Cl.
G10L 15/26    (2006.01)

(52) U.S. Cl.
CPC .................... G10L 15/26 (2013.01)

(58) Field of Classification Search
None
See application file for complete search history.

(56) References Cited

U.S. PATENT DOCUMENTS

| 6,108,627 | A | 8/2000 | Sabourin |
| 7,228,275 | B1 | 6/2007 | Endo et al. |
| 8,447,604 | B1 | 5/2013 | Chang |
| 9,384,734 | B1 * | 7/2016 | Wiseman ............ G06F 16/638 |
| 10,573,312 | B1 * | 2/2020 | Thomson ............ G10L 15/22 |
| 10,789,943 | B1 | 9/2020 | Lapshina et al. |
| 11,551,668 | B1 * | 1/2023 | Baevski ............ G06F 18/2155 |
| 11,783,008 | B2 * | 10/2023 | Jain ................. G06F 18/217 |
| | | | 382/159 |
| 12,087,276 | B1 * | 9/2024 | Nokob ................. G10L 25/78 |

(Continued)

OTHER PUBLICATIONS

Notice of Allowance from U.S. Appl. No. 17/158,805 dated Nov. 9, 2023, 13 pp.

(Continued)

Primary Examiner — Neeraj Sharma
(74) Attorney, Agent, or Firm — Shumaker & Sieffert, P.A.

(57) ABSTRACT

In general, this disclosure describes techniques for generating and evaluating automatic transcripts of audio recordings containing human speech. In some examples, a computing system is configured to: generate transcripts of a plurality of audio recordings; determine an error rate for each transcript by comparing the transcript to a reference transcript of the audio recording; receive, for each transcript, a subjective ranking selected from a plurality of subjective rank categories; determine, based on the error rates and subjective rankings, objective rank categories defined by error-rate ranges; and assign an objective ranking to a new machine-generated transcript of a new audio recording, based on the objective rank categories and an error rate of the new machine-generated transcript.

16 Claims, 7 Drawing Sheets (56) References Cited

U.S. PATENT DOCUMENTS

| | | | |
|---|---|---|---|
| 2002/0116197 A1* | 8/2002 | Erten | G06F 18/254 |
| | | | 704/E15.042 |
| 2009/0287483 A1 | 11/2009 | Co et al. | |
| 2014/0337032 A1* | 11/2014 | Aleksic | G10L 15/26 |
| | | | 704/257 |
| 2015/0254233 A1 | 9/2015 | Artzi et al. | |
| 2015/0269949 A1 | 9/2015 | Chang et al. | |
| 2016/0253999 A1 | 9/2016 | Kang et al. | |
| 2017/0193387 A1* | 7/2017 | Lavallee | G06F 40/40 |
| 2018/0068675 A1* | 3/2018 | Variani | G10L 15/20 |
| 2018/0082680 A1 | 3/2018 | Pereg et al. | |
| 2018/0096678 A1 | 4/2018 | Zhou et al. | |
| 2019/0348027 A1* | 11/2019 | Berenzweig | G10L 15/14 |
| 2022/0059075 A1 | 2/2022 | Thomson et al. | |
| 2022/0343914 A1 | 10/2022 | Bonser et al. | |

OTHER PUBLICATIONS

U.S. Appl. No. 17/158,805, filed Jan. 26, 2021, naming inventors Bay et al.

* cited by examiner

CATEGORIZING AUDIO TRANSCRIPTIONS

CROSS REFERENCE

This application is a continuation application of and claims priority to U.S. patent application Ser. No. 17/158,805 filed on Jan. 26, 2021, which is hereby incorporated by reference herein in its entirety.

TECHNICAL FIELD

The disclosure relates to computing, and in particular, to automatic speech-recognition applications.

BACKGROUND

Automatic speech recognition ("ASR") or "speech-to-text" ("STT") includes computer-based recognition and translation of spoken (verbal) language into corresponding text data. Some example speech-recognition applications include voice-user-interfaces, call routing, and automatic transcription services, such as automatic generation of subtitles for audio or video data. Advances in artificial intelligence (e.g., machine learning) and big data have resulted in the deployment of speech-recognition systems across a wide variety of disciplines and applications.

SUMMARY

In general, this disclosure describes systems and techniques for monitoring and evaluating the performance of automatic speech-recognition-and-transcription models. In some examples in accordance with this disclosure, a computing system includes a support vector machine (SVM) model trained to define objective criteria for categorizing machine-generated transcripts of audio recordings. Techniques described herein may provide one or more technical advantages that provide at least one practical application. For example, techniques described in this disclosure may generate empirically rigorous key-performance-indicator (KPI) thresholds in order to enable objective, consistent, and qualitatively meaningful indications of the performance of a transcription model, which, particularly in the AI context, may vary significantly in usability across different applications.

In one example, techniques described herein include a method including: generating, by a computing system and for each of a plurality of audio recordings, a machine-generated transcript of the audio recording; identifying, by the computing system and for each of the audio recordings, an error rate for each of the machine-generated transcripts, wherein each error rate is generated by comparing the machine-generated transcript to a reference transcript of the audio recording; receiving, by the computing system and for each of the machine-generated transcripts, a subjective ranking selected from a plurality of subjective rank categories; determining, by the computing system and based on the error rates and subjective rankings for the plurality of audio recordings, objective rank categories defined by error-rate ranges; and assigning, by the computing system and to a new machine-generated transcript of a new audio recording not included in the plurality of audio recordings, an objective ranking based on the objective rank categories and an error rate of the new machine-generated transcript.

In another example, techniques described herein include a computing system configured to: automatically generate, for each of a plurality of audio recordings, a machine-generated transcript of the audio recording; determine, for each of the audio recordings, an error rate for each the machine-generated transcript, wherein each error rate is generated by comparing the machine-generated transcript to a reference transcript of the audio recording; receive, for each of the machine-generated transcripts, a subjective ranking selected from a plurality of subjective rank categories; determine, based on the error rates and subjective rankings for the plurality of audio recordings, objective rank categories defined by error-rate ranges; and assign to a new machine-generated transcript of a new audio recording not included in the plurality of audio recordings, an objective ranking based on the objective rank categories and an error rate of the new machine-generated transcript.

In another example, techniques described herein include a non-transitory computer readable-medium comprising instructions that, when executed by processing circuitry, cause the processing circuitry to: automatically generate, for each of a plurality of audio recordings, a machine-generated transcript of the audio recording; determine, for each of the audio recordings, an error rate for each the machine-generated transcript, wherein each error rate is generated by comparing the machine-generated transcript to a reference transcript of the audio recording; receive, for each of the machine-generated transcripts, a subjective ranking selected from a plurality of subjective rank categories; determine, based on the error rates and subjective rankings for the plurality of audio recordings, objective rank categories defined by error-rate ranges; and assign, to a new machine-generated transcript of a new audio recording not included in the plurality of audio recordings, an objective ranking based on the objective rank categories and an error rate of the new machine-generated transcript.

The details of one or more examples are set forth in the accompanying drawings and the description below. Other features, objects, and advantages will be apparent from the description and drawings, and from the claims.

DETAILED DESCRIPTION

Automatic speech recognition ("ASR") or "speech-to-text" ("STT") includes computer-based recognition and translation of spoken (verbal) language into corresponding text data. Some example speech-recognition applications include voice-user-interfaces, automatic call routing, and automatic transcription services, such as automatic generation of subtitles for audio or video data. Advances in artificial intelligence (e.g., machine learning) and "big data" applications have resulted in the deployment of speech-recognition systems across a wide variety of disciplines and applications.

However, due to the nature of machine-learning models, different AI-based speech-transcription models may be more accurate or reliable (e.g., consistent) than others, particularly across different applications. Further, different (human) users of automatic speech-recognition systems may report varying evaluations of speech-recognition models and their corresponding transcription outputs, according to the subjective preferences of each user.

Although automatic transcriptions may be objectively evaluated, e.g., via qualitative word-error rates (WERs) indicating a raw percentage of "correct" and "incorrect" words within the automatic transcript, such evaluations are unlikely to be qualitatively meaningful to a human user. For example, a user may have no consistent basis on which to determine which range of WERs indicates "good" transcripts and which range of WERs indicates "bad" machine transcripts.

A further complication is that the varying relative importance of individual words may cause the range of "bad" WERs and the range of "good" WERs to at least partially overlap. For example, a particular automatic (e.g., machine-generated) transcript may include a relatively high word-error rate. However, many of the "incorrect" words of the automatic transcript may include relatively inconsequential words, such as articles and pronouns. Accordingly, these types of automatic transcripts may counter-intuitively include both a relatively "good" categorical evaluation as well as a relatively high WER. These various inconsistencies, contradictions, and subjective parameters may frustrate attempts to objectively select and evaluate a preferred speech-recognition model for a particular application.

In accordance with the techniques of this disclosure, systems and methods described herein are configured to determine an "objective," qualitative categorical assessment or evaluation of an automatic transcript of an audio recording or other audio data. For example, systems and methods described herein include techniques for training a computing system to define objective, qualitative criteria based on (1) objective, quantitative ("continuous") performance indications, and (2) subjective (e.g., human-based), qualitative ("categorical") performance indications. By extension, the objective transcription evaluations may enable an objective evaluation of the transcription model that generated the evaluations.

In some examples in accordance with the techniques of this disclosure, computing systems may be trained to implement "support vector machine" ("SVM") techniques in order to define a specific threshold boundary to translate objective, quantitative accuracy measures into objective, qualitative categories.

Figure 1:
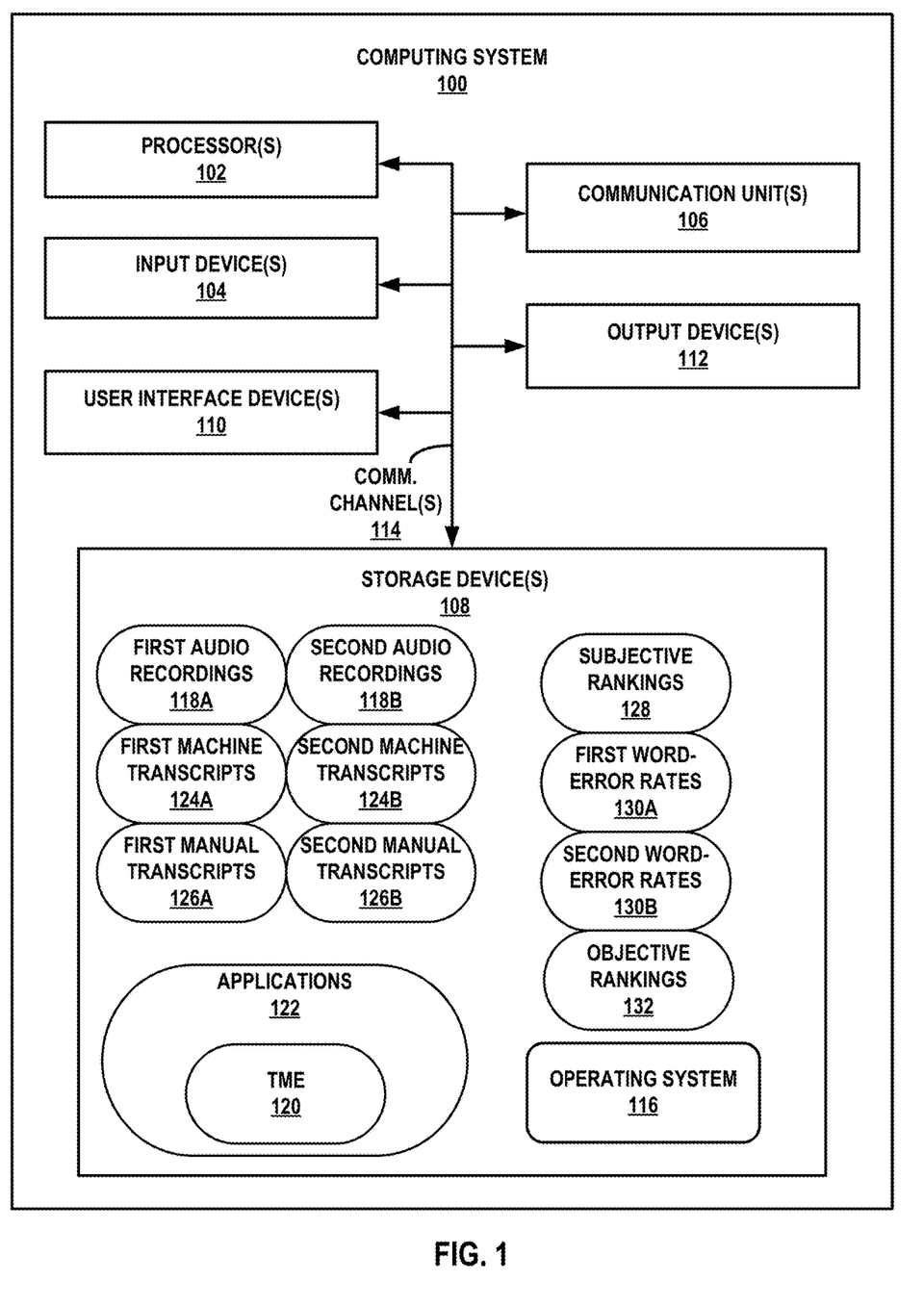
FIG. 1 is a block diagram depicting an example computing system configured to evaluate an audio transcription model, in accordance with the techniques of this disclosure.

FIG. 1 is a block diagram of an example computing system 100 that operates in accordance with one or more techniques of the present disclosure. FIG. 1 illustrates an example of a computing system that may be implemented through one or more computing devices, each computing device including one or more processors 102 and configured to define objective-assessment criteria for machine transcripts of audio recordings.

In the example of FIG. 1, computing system 100 may represent a workstation, server, mainframe computer, notebook or laptop computer, desktop computer, tablet, smartphone, feature phone, cloud computing system, virtualized compute node, virtual machines, containers, and/or other programmable data-processing apparatus of any kind. In some examples, a computing system may be or may include any component or system that includes one or more processors or other suitable computing environment for executing software instructions and, for example, need not necessarily include one or more elements shown in FIG. 1 (e.g., communication units 106; and in some examples, components such as storage device(s) 108 may not be in the computing system 100). Although illustrated as a single computing system in the example of FIG. 1, in other examples, computing system 100 in FIG. 1 may be using multiple computing devices.

As shown in the example of FIG. 1, computing system 100 includes one or more processors 102, one or more input devices 104, one or more communication units 106, one or more output devices 112, one or more storage devices 108, and one or more user interface (UI) devices 110. Computing system 100, in one example, further includes one or more applications 122 and operating system 116 that are executable by computing system 100. Each of components 102, 104, 106, 108, 110, and 112 are coupled (physically, communicatively, and/or operatively) for inter-component communications. In some examples, communication channels 114 may include a system bus, a network connection, an inter-process communication data structure, or any other method for communicating data. As one example, components 102, 104, 106, 108, 110, and 112 may be coupled by one or more communication channels 114. In some examples, two or more of these components may be distributed across multiple (discrete) computing devices. In some such examples, communication channels 114 may include wired or wireless data connections between the various computing devices.

Processors 102, in some examples, are configured to implement functionality and/or process instructions for execution within computing system 100. For example, processors 102 may be capable of processing instructions stored in storage device 108. Examples of processors 102 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 108 may be configured to store information within computing system 100 during operation. Storage device(s) 108, in some examples, is described as a computer-readable storage medium. In some examples, storage device 108 is a temporary memory, meaning that a primary purpose of storage device 108 is not long-term storage. Storage device 108, in some examples, is described as a volatile memory, meaning that storage device 108 does not maintain stored contents when the computer is turned off. Examples of volatile memories include random access memories (RAM), dynamic random access memories (DRAM), static random access memories (SRAM), and other forms of volatile memories known in the art. In some examples, storage device 108 is used to store program instructions for execution by processors 102. Storage device 108, in one example, is used by software or applications running on computing system 100 to temporarily store information during program execution. For example, as shown in FIG. 1, storage device 108 is configured to store operating system 116, a first set of one or more audio recordings 118A and a second set of one or more audio recordings 118B (collectively, "audio recordings 118"), a first set of automatic (e.g., machine-generated) transcripts 124A of audio recordings 118A and a second set of machine transcripts 124B of audio recordings 118B (collectively, "machine transcripts 124"), a first set of manual (e.g., human-generated) transcripts 126A of audio recordings 118A and a second set of manual transcripts 126B of audio recordings 118B (collectively, "manual transcripts 126"), a set of subjective rankings 128 of first machine transcripts 118A received from human subject-matter experts ("SMEs"), a first set of word-error rates (WERs) 130A of first machine transcripts 118A and a second set of WERs 130B of second machine transcripts 118B (collectively, "WERs 130"), a set of objective rankings 132 of second machine transcripts 118B, and various programs or applications 122, including a transcription-model evaluator ("TME") 120, in accordance with techniques of this disclosure, as detailed further below.

Storage devices 108, in some examples, also include one or more computer-readable storage media. Storage devices 108 may be configured to store larger amounts of information than volatile memory. Storage devices 108 may further be configured for long-term storage of information. In some examples, storage devices 108 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing system 100, in some examples, also includes one or more communication units 106. Computing system 100 may utilize communication units 106 to communicate with external devices via one or more networks, such as one or more wired/wireless/mobile networks. Communication unit(s) 106 may include a network interface card, such as an Ethernet card, an optical transceiver, a radio frequency transceiver, or any other type of device that can send and receive information. Other examples of such network interfaces may include 3G, 4G, 5G and Wi-Fi radios. In some examples, computing system 100 uses communication unit 106 to communicate with an external device.

Computing system 100, in some examples, also includes one or more user interface devices 110. User interface devices 110 may be configured to receive input from a user through tactile, audio, or video feedback. Examples of user interface device(s) 110 include a presence-sensitive display, a mouse, a keyboard, a voice responsive system, video camera, microphone or any other type of device for detecting a command from a user. In some examples, a presence-sensitive display includes a touch-sensitive screen.

One or more output devices 112 may also be included in computing system 100. Output device 112, in some examples, is configured to provide output to a user using tactile, audio, or video stimuli. Output device 112, in one example, includes a presence-sensitive display, a sound card, a video graphics adapter card, or any other type of device for converting a signal into an appropriate form understandable to humans or machines. Additional examples of output device 112 include a speaker, a cathode ray tube (CRT) monitor, a liquid crystal display (LCD), or any other type of device that can generate intelligible output to a user.

Computing system 100 may include operating system 116. Operating system 116, in some examples, controls the operation of components of computing system 100. For example, operating system 116 may facilitate communication of one or more applications 122 with processors 102, communication unit 106, storage device 108, input device 104, user interface device 110, and output device 112. Application 122 may also include program instructions and/or data that are executable by computing system 100.

Transcript-model evaluator (TME) 120 is one example of an application 122 of computing system 100. TME 120 may include instructions for causing computing system 100 to perform techniques described in the present disclosure. For example, TME 120 may generate objective criteria for evaluating an automatic transcript of an audio recording. For example, in accordance with techniques of this disclosure, and as detailed further below, TME 120 may intelligently define a set of ranges within a continuous (e.g., quantitative) key performance indicator (KPI), wherein each range of the continuous KPI represents a different category of an objective, categorical (e.g., qualitative) KPI.

These newly defined categorical KPIs provide a consistent, objective basis of evaluation for audio-transcription applications that is also qualitatively meaningful for users of the system, e.g., when compared to typical subjective (e.g., human-based) assessment techniques that lack consistency, or as compared to raw numerical-based assessment techniques that lack qualitative meaning. These advantages, improvements, and benefits may in turn increase a cost-effectiveness associated with selecting and maintaining audio-transcription models for a particular application.

Figure 2:
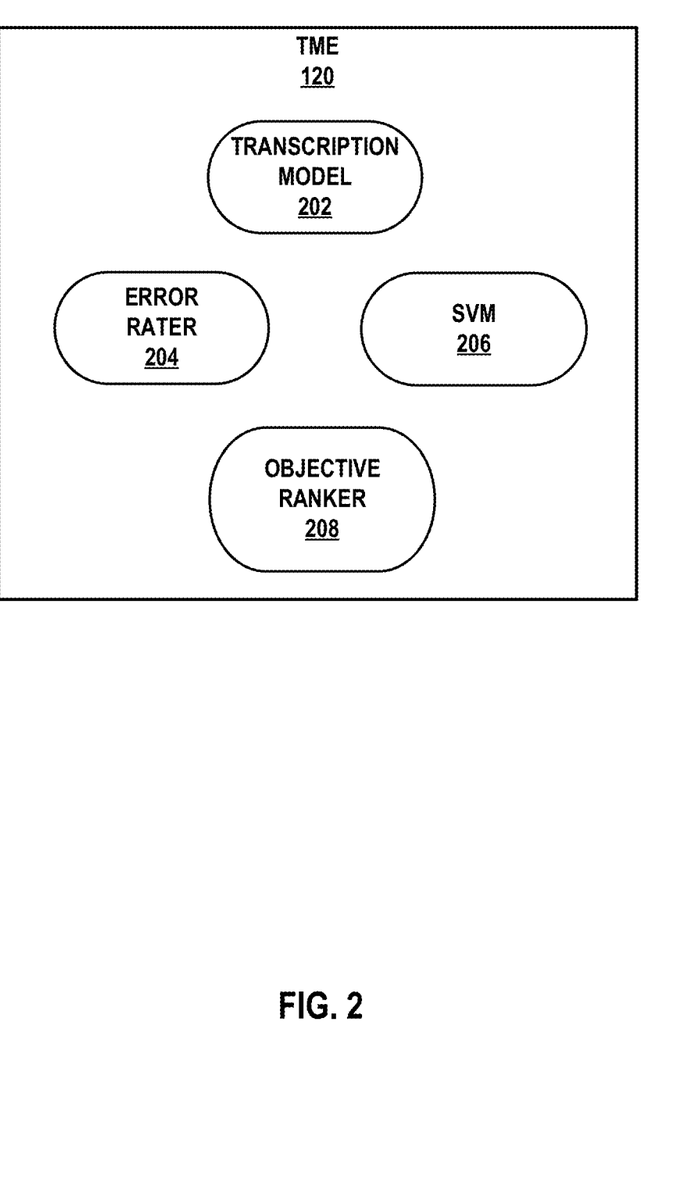
FIG. 2 is a block diagram depicting example components of the transcription-model-evaluation module of FIG. 1.
Figure 3A:
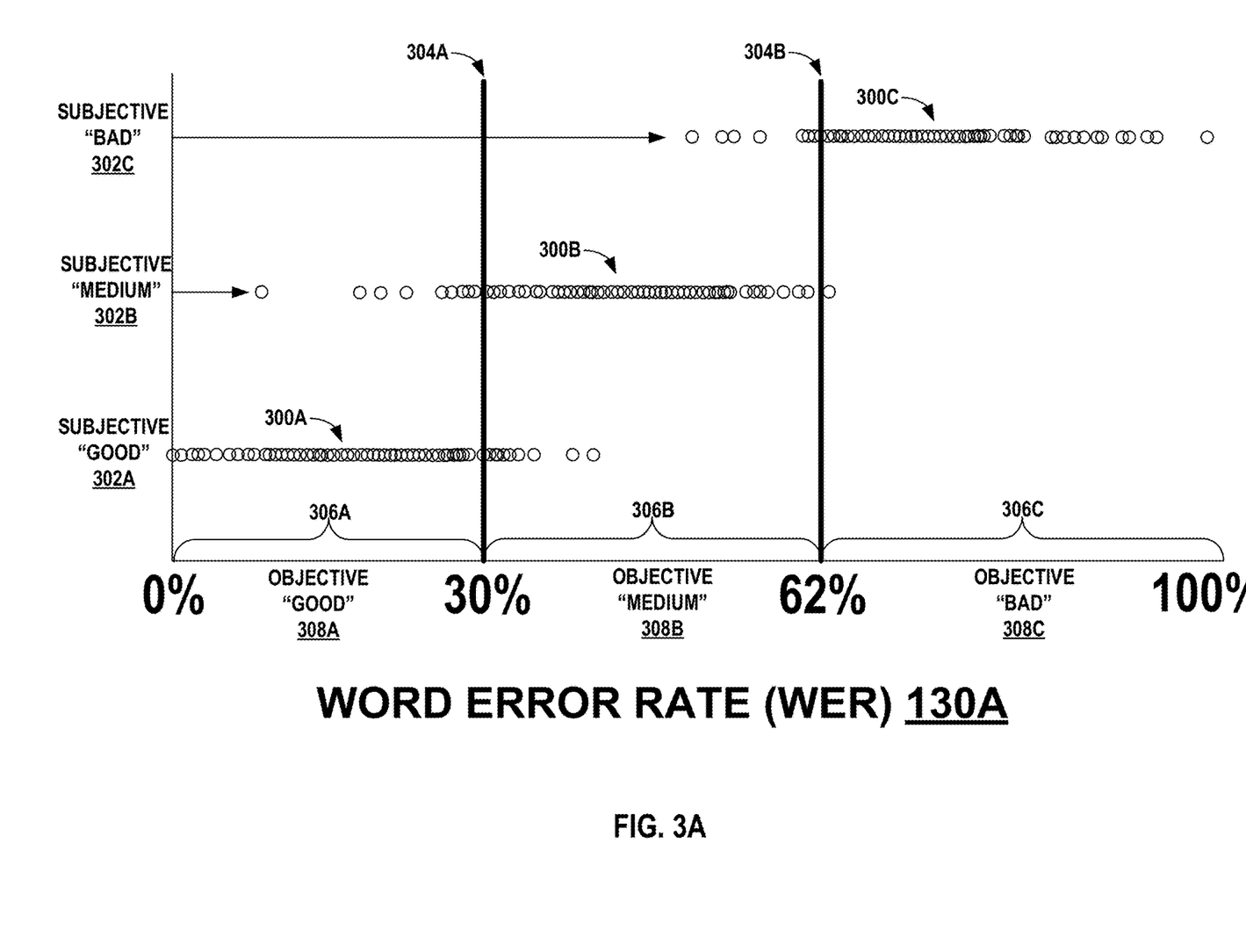
FIG. 3A is a scatter plot and conceptual diagram illustrating techniques for evaluating automatic audio transcripts and/or corresponding transcription models, in accordance with the techniques of this disclosure.
Figure 3B:
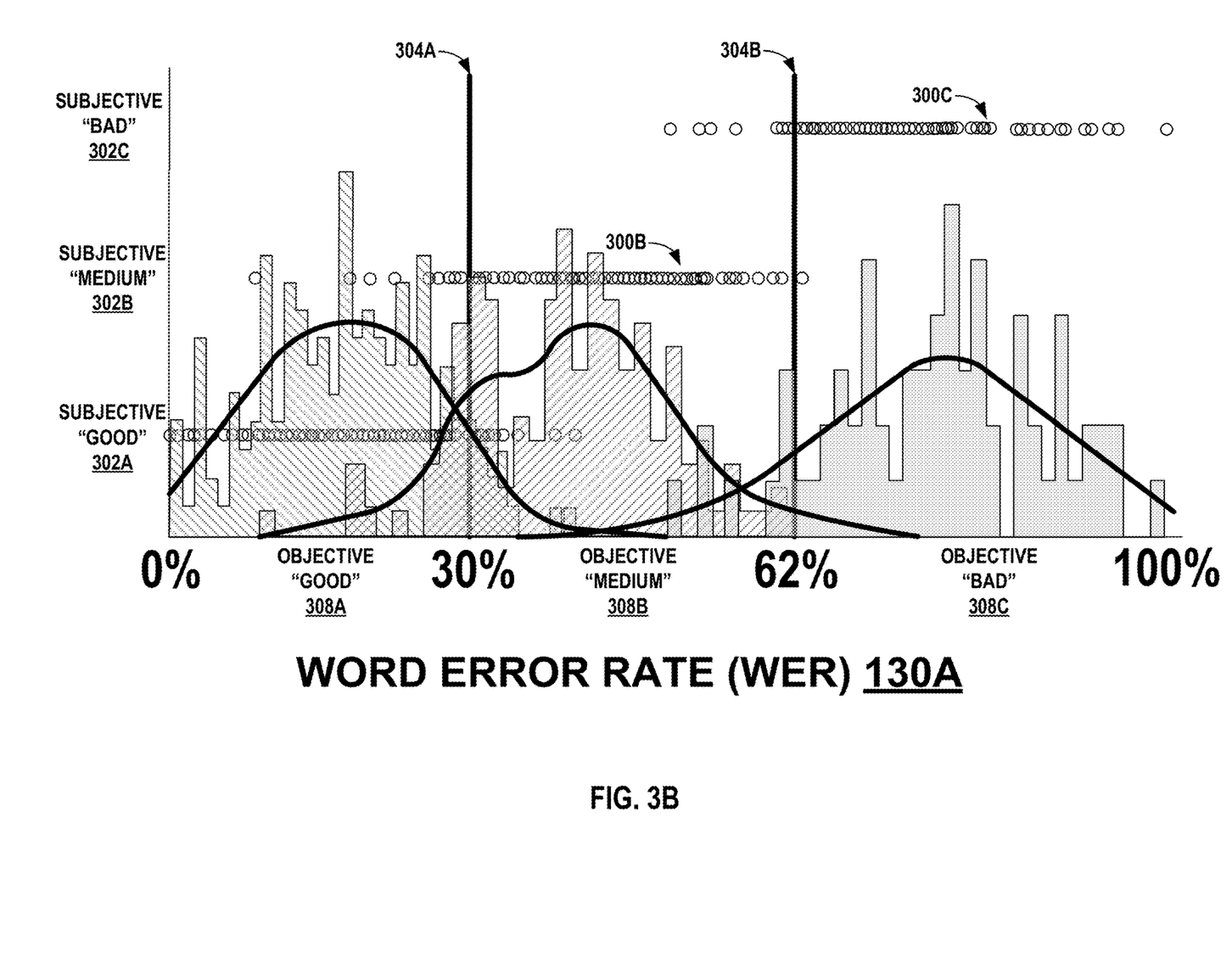
FIG. 3B is a histogram and corresponding fit-curves of the scatter plot of FIG. 3A, in accordance with the techniques of this disclosure.

FIG. 2 is a block diagram illustrating example components or modules of TME 120 of FIG. 1. FIG. 3A is a scatter plot, and FIG. 3B is a histogram and corresponding fit-curves, of an example dataset that may be generated and manipulated according to the techniques of FIG. 2. For illustrative purposes and for ease of understanding, the functionality of the modules of FIG. 2 are described with reference to the example computing system 100 of FIG. 1 and the example dataset depicted in FIGS. 3A and 3B.

As shown in FIG. 2, TME 120 includes transcription model 202, error rater 204, support vector machine (SVM) 206, and objective ranker 208. In other examples, TME 120 may include more, fewer, or different components.

Transcription model 202 is configured to receive a first plurality of audio recordings 118A, or other audio data containing human speech, and automatically generate, for each audio recording 118A, a corresponding machine transcript 124A including textual data indicative of the human speech contained within the respective audio recording 118A. In some examples, but not all examples, transcription model 202 includes an artificial-intelligence (AI), deep-learning, or machine-learning model that has been trained to recognize and transcribe human speech.

In some examples, but not all examples, TME 120 includes error rater 204. Error rater 204 may be configured to receive the set of machine transcripts 124A, and a corresponding set of "manual" transcripts (or "reference" transcripts) 126A. As detailed further below, reference transcripts 126A may be produced by one or more human subject-matter experts (SMEs). For purposes of simplicity, manual transcripts 126A may be presumed to be "ideal," "perfect," or "ground truth" transcriptions of the speech contained within audio recordings 118A.

Error rater 204 may be configured to compare machine transcripts 124A to manual transcripts 126A in order to determine an objective, quantitative, continuous key performance indicator ("continuous KPI") for each machine transcript 124A. For example, error rater 204 may compare machine transcripts 124A to reference transcripts 126A to determine a "word error rate" ("WER") 130A for each machine transcript 124A, wherein the WER 130A indicates a total percentage of incorrect or "missed" words within the respective machine transcript 124A, or equivalently, a ratio of missed or incorrect words in the machine transcript 124A to the total number of words within the corresponding reference transcript 126A.

In some examples, the calculation for the word error rate may include an additional weighting or weight factor, indicating the relative importance of each incorrect and missed word for human comprehension of the audio recording. For example, each word within an audio recording may include a different relative importance to the overall semantic meaning of the message encoded within the audio recording. As one non-limiting example, certain words, such as articles, (e.g., "a," "an," or "the") may be less important to the semantic meaning of a sentence than the subject (e.g., noun) or the predicate (e.g., verb) of the sentence. As another example, adjectives and adverbs may be less semantically important than the subject and predicate, but more important than articles (or prepositions, or the like). Accordingly, each incorrect or missed word within a machine transcript 124A may include a corresponding weighting or ranking of its relative importance for human comprehension of the machine transcript 124A. Accordingly, another example calculation of a word error rate 130A may include summing (e.g., adding) all of the relative rankings of the missed words in the machine transcript 124A, and dividing the sum by the total number of words in the reference transcript 126A.

In other examples, such as the example described with respect to FIG. 4A below, TME 120 might not include error rater 204, and instead, the human SMEs may manually compare machine transcripts 124A to manual transcripts 126A to determine the WERs 130A.

TME 120 further includes support vector machine (SVM) 120. SVM 120 is configured to receive, for each of the first machine transcripts 124A, a corresponding WER 130A and a subjective ranking 128 indicative of the quality (e.g., readability) of the respective machine transcript 124A. For example, one of more of the SMEs may read each machine transcript 124A and assign, to each machine transcript 124A, a subjective, qualitative, "categorical" key performance indicator ("categorical KPI").

For example, each SME may subjectively evaluate the overall readability of each machine transcript 124A and assign a subjective ranking 128. As illustrated in FIG. 3A, the subjective rankings 128 may be selected from a predetermined, finite set of subjective rank categories 302A-302C (collectively, "subjective rank categories 302"). In one example, the subjective rank categories 302 may include indications of whether the SME considered the respective machine transcript 124A to be a "good" quality transcription (302A), a "medium" quality transcription (302B), or a "bad" quality transcription (302C) of the speech contained within each audio recording 118A. In other examples, the categorical KPIs may include more, fewer, or different subjective rank categories 302.

As illustrated in FIG. 3A, the collective pairs of subjective rankings 128 from the SMEs and the WERs 130A for a respective machine transcript 124A may be conceptualized as sets of data points 300A, 300B, and 300C (individually within a set, "data point 300," and collectively, "datapoints 300"). In other words, each datapoint 300 includes both (1) an objective, continuous KPI (e.g., a WER 130A) and (2) a corresponding subjective, categorical KPI (e.g., a subjective ranking 128). SVM 206 is configured to evaluate each of datapoints 300 (including the objective WERs 130A and the subjective rankings 128) and determine a set of objective criteria for qualitatively evaluating a subsequent or second set of audio recordings 118B.

For example, as illustrated in FIG. 3A, SVM 206 may be configured to determine, based on the subjective rankings 128 and the WERs 130A, a set of objective, qualitative rank categories 308A-308C (collectively, "objective rank categories 308") defined by discrete (e.g., non-overlapping) ranges of word-error rates (WERs) 306A-306C (collectively, "error-rate ranges 306"). In other words, SVM 206 may be configured to select boundaries 304A, 304B (collectively, "error-rate boundaries 304") between error-rate ranges 306, wherein each error-rate range 306 corresponds to an objective, qualitative rank category 308.

In some examples in accordance with this disclosure, SVM 206 is configured to apply one or more support vector machine algorithms to datapoints 300. As used herein, SVM algorithms include any of a number of mathematical or computational techniques for selecting "optimal" boundaries between different groups of data. In some examples, but not all examples, SVM 206 may include one or more AI, deep-learning, or machine-learning-based models trained to select error-rate boundaries 304.

For example, for two consecutive, non-overlapping (e.g., linearly separable) datasets (e.g., groups of datapoints), SVM 206 may be configured to select a "hard" boundary that is some distance (e.g., halfway) between the "support vector" datapoint from either dataset that is closest to the boundary. In other examples, such as for any two consecutive, overlapping datasets (e.g., datasets 300A and 300B, or datasets 300B and 300C, as shown in FIG. 3A), SVM 206 may be configured to select a "soft" boundary 304 based on the distance between each datapoint and the boundary, and based on the number or ratio of datapoints from a common dataset falling on the "correct" (e.g., common) side of the boundary 304.

Once SVM 206 has selected the error-rate boundaries 304 between error-rate ranges 306 to define objective rank categories 308, computing system 100 may receive a subsequent or secondary set of audio recordings 118B or other audio data. Based on the second audio recordings 118B, speech-recognition and transcription model 202 generates a corresponding set of subsequent machine transcripts 124B. Error rater 204 receives the set of machine transcripts 124B, and a corresponding set of manual transcripts 126B from the human SMEs.

Error rater 204 compares the subsequent machine transcripts 124B to the subsequent manual transcripts 126B and determines the objective, quantitative, continuous KPI, such as the word-error rate 130B, for each machine transcript 124B. In other examples, such as the example described with respect to FIG. 4A below, TME 120 does not include error rater 204, and instead, the human SMEs may manually compare machine transcripts 124B to manual transcripts 126B to determine the WERs 130B.

TME 120 includes objective ranker 208. Based on the WERs 130B, the previously defined error-rate ranges 306, and the corresponding objective rank categories 308, objective ranker 208 assigns, to each machine transcript, an objective category or categorical ranking 132. As one non-limiting example, according to the example error-rate ranges shown in FIGS. 3A and 3B, objective ranker 208 might assign a machine transcript 124B having a WER 130B of 65% to an objective rank category 308C of "Bad." Computing system 100 may be configured to store the assigned objective rankings 132, such as within storage devices 108, for further processing.

As one example practical application of the techniques of this disclosure, computing system 100 may be configured to monitor the relative percentages of assigned objective rankings to assess the overall quality of the application that generated the machine transcripts 124, such as speech-recognition and transcription model 202. A user of computing system 100 may set customizable thresholds such that, when a relative percentage of assigned objective "bad" rankings exceeds a threshold value, computing system 100 determines that transcription model 202 is a "bad" speech-recognition application and should be updated or replaced. In some such examples, computing system 100 may generate and output an alert to indicate that transcription model 202 is not meeting performance expectations.

Figure 4A:
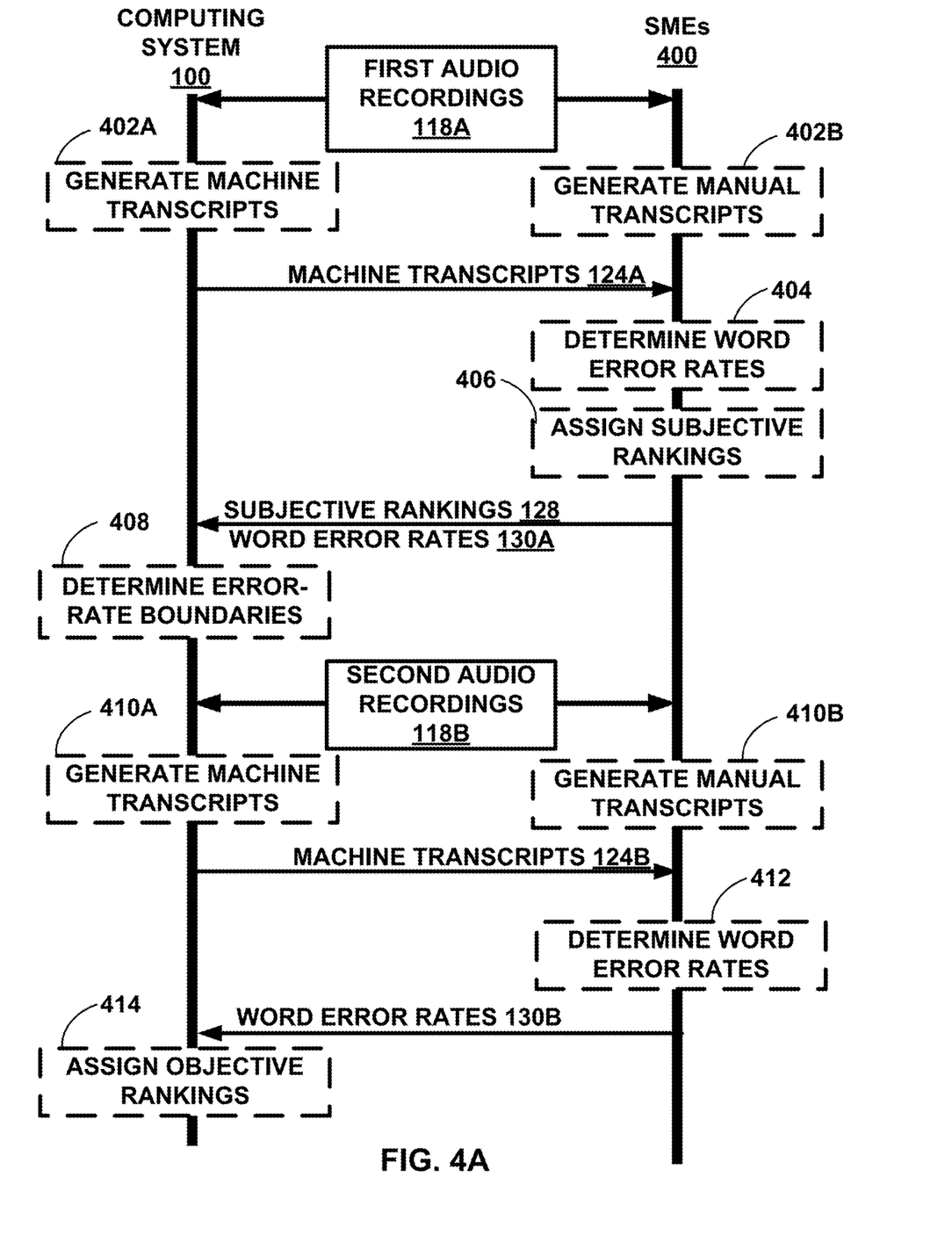
FIG. 4A is a flowchart illustrating an example operation of a computing system configured to evaluate an audio-transcription model, in accordance with the techniques of this disclosure.

FIG. 4A is a flowchart illustrating an example operation of a computing system configured for evaluating speech-recognition models or applications, in accordance with one or more aspects of this disclosure. FIG. 4A is described in the context of the example computing system 100 illustrated in FIG. 1 and the example datasets depicted in FIGS. 3A and 3B.

A speech-recognition application (e.g., transcription model 202) of computing system 100 is configured to receive a first plurality of audio recordings 118A, or other audio data containing human speech, and automatically generate, for each audio recording 118A, a corresponding machine transcript 124A including textual data indicative of the human speech contained within the respective audio recording 118A (402A).

One or more human subject-matter experts (SMEs) 400 may also receive the same audio recordings 118A, and, for each audio recording 118A, generate a "manual" transcript 126A of the respective audio recording 118A (402B). As mentioned above, the manual transcripts 126A (or "reference" transcripts 126A) might be presumed to be "ideal" or "perfect" transcriptions of the speech contained within audio recordings 118A.

SMEs 400 receive machine transcripts 124A from computing system 100 and compare machine transcripts 124A to reference transcripts 126A in order to determine an objective, quantitative, continuous key performance indicator ("continuous KPI") for each machine transcript 124A. For example, SMEs 400 may compare machine transcripts 124A to reference transcripts 126A to determine a "word error rate" ("WER") 130A for each machine transcript 124A, wherein the WER 130A indicates a total percentage of incorrect or "missed" words within the respective machine transcript 124A, or equivalently, a ratio of missed or incorrect words in the machine transcript 124A to the total number of words within the corresponding reference transcript 126A (404).

Additionally, one of more of the SMEs 400 may read each machine transcript 124A and assign, to each machine transcript 124A, a subjective, qualitative, "categorical" key performance indicator ("categorical KPI"). For example, each SME 400 may subjectively evaluate the overall readability of each machine transcript 124A and assign a subjective ranking 128 selected from a predetermined, finite set of subjective rank categories 302A-302C (406). In one example, the subjective rank categories 302A-302C may include indications of whether each machine transcript 124A was a "good" quality transcription (302A), a "medium" quality transcription (302B), or a "bad" quality transcription (302C) of the speech contained within each audio recording 118A. In other examples, the categorical KPIs may include more, fewer, or different subjective rank categories 302.

At this stage, SMEs 400 have generated a set of data points 300A-300C (collectively, "datapoints 300") for SMEs 400 and for machine transcripts 124A, wherein each datapoint 300 includes both (1) an objective, continuous KPI (e.g., a WER 130A) and (2) a corresponding subjective, categorical KPI (e.g., a subjective ranking 128). The SMEs 400 input these datapoints into computing system 100 for further analysis. In some examples, but not all examples, if multiple different human SMEs 400 evaluate the same machine transcript 124A (e.g., produce their own subjective ranking 128 for the same machine transcript 124A), the various subjective rankings 128 for a single machine transcript 124A may be averaged together into a common datapoint 300, such that each machine transcript 124A corresponds to exactly one datapoint 300. In other examples, the subjective rankings 128 for a common machine transcript 124A may not be averaged together, such that each datapoint 300 represents the subjective ranking 128 of a machine transcript 124A by a single SME 400.

In accordance with techniques of this disclosure, computing system 100 may be configured to receive the datapoints 300 (including the objective WERs 130A and the subjective rankings 128) and determine a set of objective criteria for qualitatively evaluating a subsequent or second set of audio recordings 118B. For example, computing system 100 may be configured to determine, based on the subjective rankings 128 and the WERs 130A, a set of objective, qualitative rank categories 308A-308C (collectively, "objective rank categories 308") defined by discrete (e.g., non-overlapping) ranges of word-error rates (WERs) 306A-306C (collectively, "error-rate ranges 308"). In other words, computing system 100 may be configured to select boundaries 304A, 304B (collectively, "error-rate boundaries 304") between error-rate ranges 306, wherein each error-rate range 306 corresponds to an objective, qualitative rank category 308 (408).

In some examples in accordance with this disclosure, computing system 100 includes (e.g., is programmed with) a support vector machine application or module 206 ("SVM 206"). SVM 206 is configured to apply one or more support vector machine algorithms to datapoints 300. As used herein, SVM algorithms include any of a number of mathematical or computational techniques for selecting "optimal" boundaries between different groups of data.

For example, for two consecutive, non-overlapping (e.g., linearly separable) datasets (e.g., groups of datapoints), SVM algorithms may be configured to select a "hard" boundary that is some distance between the "support vector" datapoint from either dataset that is closest to the boundary. In other examples, such as for any two consecutive, overlapping datasets (e.g., datasets 300A and 300B, or datasets 300B and 300C, as shown in FIG. 3A), SVM algorithms may be configured to select a "soft" boundary 304 based on the distance between each datapoint and the boundary, and based on the number or ratio of datapoints from a common dataset falling on the "correct" side of the boundary.

Although there may be virtually unlimited mathematical equations that may be used to selected boundaries 304, one non-limiting example of an SVM algorithm is shown below in Equation (1). For example, given training vectors $x_i \in \mathbb{R}^P$ for i=1 to n in two classes, and a vector $y \in \{1, -1\}^n$, SVM 206 may attempt to find $w \in \mathbb{R}^P$ and $b \in \mathbb{R}$ such that the prediction given by $\text{sign}(w^T\phi(x)+b)$ is correct for most samples by solving:

$$\min_{w,b} \frac{1}{2} w^T w + C \sum_{i=0} \max\left(0, y_i(w^T \Phi(x_i) + b)\right) \qquad (1)$$

In Equation (1), T represents the transpose of w, C is a user-customizable parameter that trades off misclassification of training examples against the simplicity of the decision surface, and Φ is the identify function.

Once computing system 100 has selected the error-rate boundaries 304 between error-rate ranges 306 to define objective rank categories 308, computing system 100 may receive a subsequent or secondary set of audio recordings 118B or other audio data. Based on the second audio recordings 118B, speech-recognition and transcription model 202 generates a corresponding set of machine transcripts 124B (410A).

SMEs 400 may also receive the same audio recordings 118B, and, for each audio recording 118B, manually generate a "manual" transcript 126B (or "reference" transcript 126B) of the respective audio recording 118B (410B).

SMEs 400 receive machine transcripts 124B from computing system 100 and compare machine transcripts 124B to reference transcripts 126B in order to manually determine an objective, quantitative, continuous KPI for each machine transcript 124B, such as a WER 130B for each machine transcript 124B (412). SMEs 400 may then input the WERs 130B for each machine transcript 124B into computing system 100.

Based on the WERs 130B, the previously defined error-rate ranges 306, and the corresponding objective rank categories 308, computing system 100 assigns, to each machine transcript, an objective ranking (414). As one non-limiting example using the example error-rate ranges shown in FIGS. 3A and 3B, computing system 100 might assign a machine transcript 124B having a WER 130B of 65% to an objective rank category 308C of "Bad." Computing system 100 may be configured to store the assigned objective rankings for further processing.

As one example practical application of the techniques of this disclosure, computing system 100 may be configured to monitor the relative percentages of assigned objective rankings to assess the overall quality of the application that generated the machine transcripts 124, such as speech-recognition and transcription model 202. A user of computing system 100 may set customizable thresholds such that, when a relative percentage of assigned objective "bad" rankings exceeds a threshold value, computing system 100 determines that transcription model 202 is a "bad" speech-recognition application and should be updated or replaced. In some such examples, computing system 100 may generate and output an alert to indicate that transcription model 202 is not meeting performance expectations.

Figure 4B:
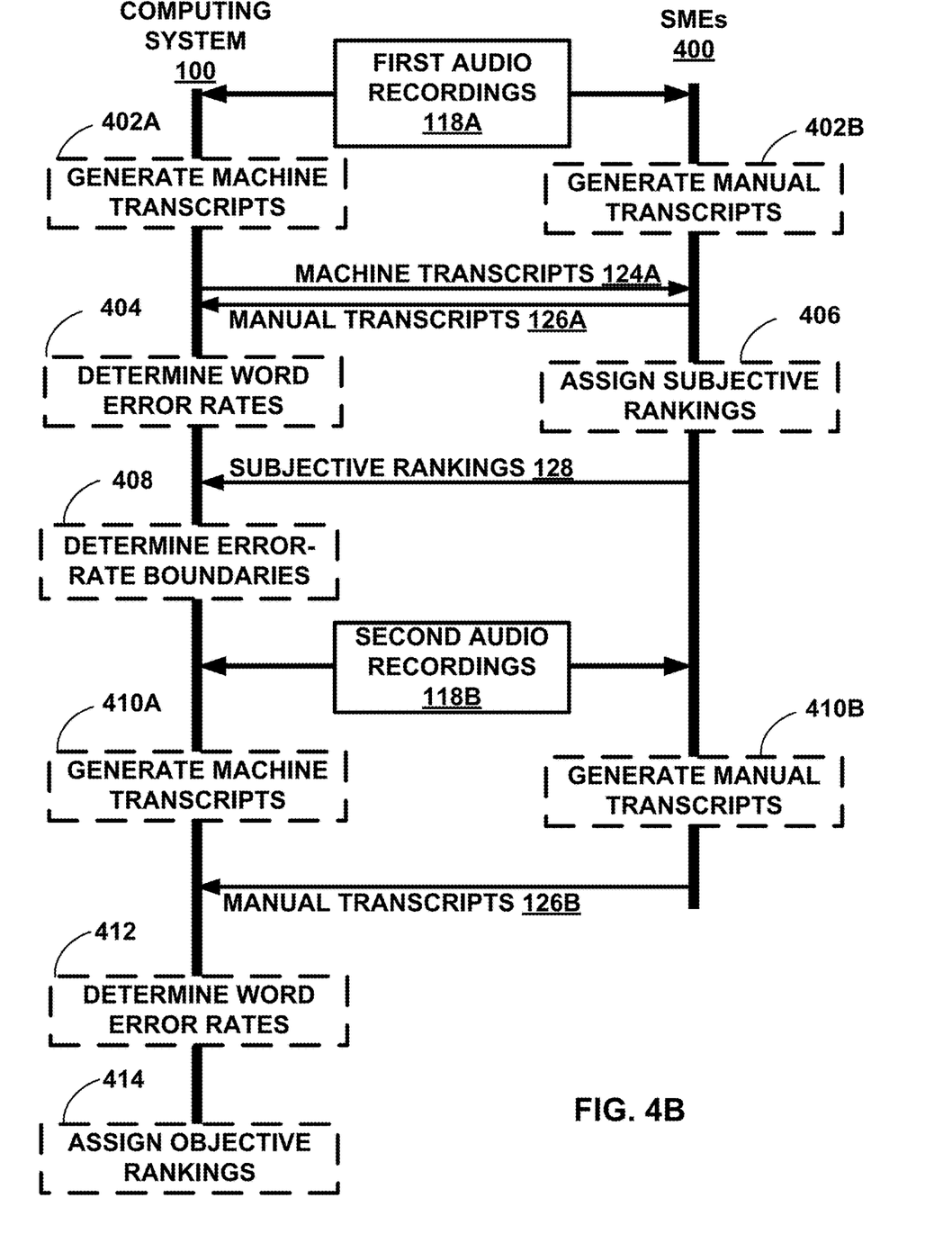
FIG. 4B is a flowchart illustrating another example operation of a computing system configured to evaluate an audio-transcription model, in accordance with the techniques of this disclosure.

FIG. 4B is a flowchart illustrating another example operation of a computing system configured for evaluating speech-recognition models or applications, in accordance with one or more aspects of this disclosure. The example operation illustrated in FIG. 4B is similar to the example operation illustrated in FIG. 4A, except that, rather than the human SMEs determining the word-error rates manually, computing system 100 is configured to automatically determine the word-error rates 130A and 130B. FIG. 4B is described in the context of the example computing system 100 illustrated in FIG. 1 and the example datasets depicted in FIGS. 3A and 3B.

A speech-recognition application (e.g., transcription model 202) of computing system 100 is configured to receive a first plurality of audio recordings 118A, or other audio data containing human speech, and automatically generate, for each audio recording 118A, a corresponding machine transcript 124A including textual data indicative of the human speech contained within the respective audio recording 118A (402A).

One or more human subject-matter experts (SMEs) 400 may also receive the same audio recordings 118A, and, for each audio recording 118A, generate a "manual" transcript 126A of the respective audio recording 118A (402B). As mentioned above, the manual transcripts 126A (or "reference" transcripts 126A) might be presumed to be "ideal" or "perfect" transcriptions of the speech contained within audio recordings 118A.

Computing system 100 and SMEs 400 exchange their respective transcripts. For example, computing system 100 outputs machine transcripts 124A to SMEs 400, and SMEs 400 input manual transcripts 126A into computing system 100.

Computing system 100 receives manual transcripts 126A from SMEs 400 and compares machine transcripts 124A to manual transcripts 126A in order to determine an objective, quantitative, continuous key performance indicator ("continuous KPI") for each machine transcript 124A. For example, computing system 100 may compare machine transcripts 124A to reference transcripts 126A to determine a "word error rate" ("WER") 130A for each machine transcript 124A, wherein the WER 130A indicates a total percentage of incorrect or "missed" words within the respective machine transcript 124A, or equivalently, a ratio of missed or incorrect words in the machine transcript 124A to the total number of words within the corresponding reference transcript 126A (404).

SMEs 400 receive machine transcripts 124A from computing system 100 and assign, to each machine transcript 124A, a subjective, qualitative, "categorical" key performance indicator ("categorical KPI"). For example, each SME 400 may subjectively evaluate the overall readability of each machine transcript 124A and assign a subjective ranking 128 selected from a predetermined, finite set of subjective rank categories 302A-302C (406). In one example, the subjective rank categories 302A-302C may include indications of whether each machine transcript 124A was a "good" quality transcription (302A), a "medium" quality transcription (302B), or a "bad" quality transcription (302C) of the speech contained within each audio recording 118A. In other examples, the categorical KPIs may include more, fewer, or different subjective rank categories 302. SMEs 400 input the subjective rankings 128 into computing system 100.

Computing system 100 generates a set of data points 300A-300C, each datapoint including, for each machine transcript 124A, both (1) an objective, continuous KPI (e.g., a WER 130A) and (2) a corresponding subjective, categorical KPI (e.g., a subjective ranking 128).

In accordance with techniques of this disclosure, computing system 100 may be configured to determine, based on datapoints 300 (including the objective WERs 130A and the subjective rankings 128), a set of objective criteria for qualitatively evaluating a subsequent or second set of audio recordings 118B. For example, computing system 100 may be configured to determine, based on the subjective rankings 128 and the WERs 130A, a set of objective, qualitative rank categories 308A-308C (collectively, "objective rank categories 308") defined by discrete (e.g., non-overlapping) ranges of word-error rates (WERs) 306A-306C (collectively, "error-rate ranges 308"). In other words, computing system 100 may be configured to select boundaries 304A, 304B (collectively, "error-rate boundaries 304") between error-rate ranges 306, wherein each error-rate range 306 corresponds to an objective, qualitative rank category 308 (408).

In some examples in accordance with this disclosure, computing system 100 includes (e.g., is programmed with) a support vector machine ("SVM") application or module 206 ("SVM 206") configured to apply one or more support vector machine algorithms to datapoints 300. As used herein, SVM algorithms include any of a number of mathematical or computational techniques for selecting "optimal" boundaries between different groups of data.

For example, for two consecutive, non-overlapping (e.g., linearly separable) datasets (e.g., groups of datapoints), SVM algorithms may be configured to select a "hard" boundary that is some distance between the "support vector" datapoint from either dataset that is closest to the boundary. In other examples, such as for any two consecutive, overlapping datasets (e.g., datasets 300A and 300B, or datasets 300B and 300C, as shown in FIG. 3A), SVM algorithms may be configured to select a "soft" boundary 304 based on the distance between each datapoint and the boundary, and based on the number or ratio of datapoints from a common dataset falling on the "correct" side of the boundary.

Once computing system 100 has selected the error-rate boundaries 304 between error-rate ranges 306 to define objective rank categories 308, computing system 100 may receive a subsequent or secondary set of audio recordings 118B or other audio data. Based on the second audio recordings 118B, speech-recognition and transcription model 202 generates a corresponding set of machine transcripts 124B (410A).

SMEs 400 may also receive the same audio recordings 118B, and, for each audio recording 118B, manually generate a "manual" transcript 126B (or "reference" transcript 126B) of the respective audio recording 118B (410B).

Computing system 100 receives manual transcripts 126B from SMEs 400 and compares machine transcripts 124B to manual transcripts 126B in order to determine an objective, quantitative, continuous KPI for each machine transcript 124B, such as a WER 130B for each machine transcript 124B (412).

Based on the WERs 130B, the previously defined error-rate ranges 306, and the corresponding objective rank categories 308, computing system 100 assigns, to each machine transcript, an objective ranking (414). As one non-limiting example using the example error-rate ranges shown in FIGS. 3A and 3B, computing system 100 might assign a machine transcript 124B having a WER 130B of 65% to an objective rank category 308C of "Bad." Computing system 100 may be configured to store the assigned objective rankings for further processing.

As one example practical application of the techniques of this disclosure, computing system 100 may be configured to monitor the relative percentages of assigned objective rankings to assess the overall quality of the application that generated the machine transcripts 124, such as speech-recognition and transcription model 202. A user of computing system 100 may set customizable thresholds such that, when a relative percentage of assigned objective "bad" rankings exceeds a threshold value, computing system 100 determines that transcription model 202 is a "bad" speech-recognition application and should be updated or replaced. In some such examples, computing system 100 may generate and output an alert to indicate that transcription model 202 is not meeting performance expectations.

Figure 5:
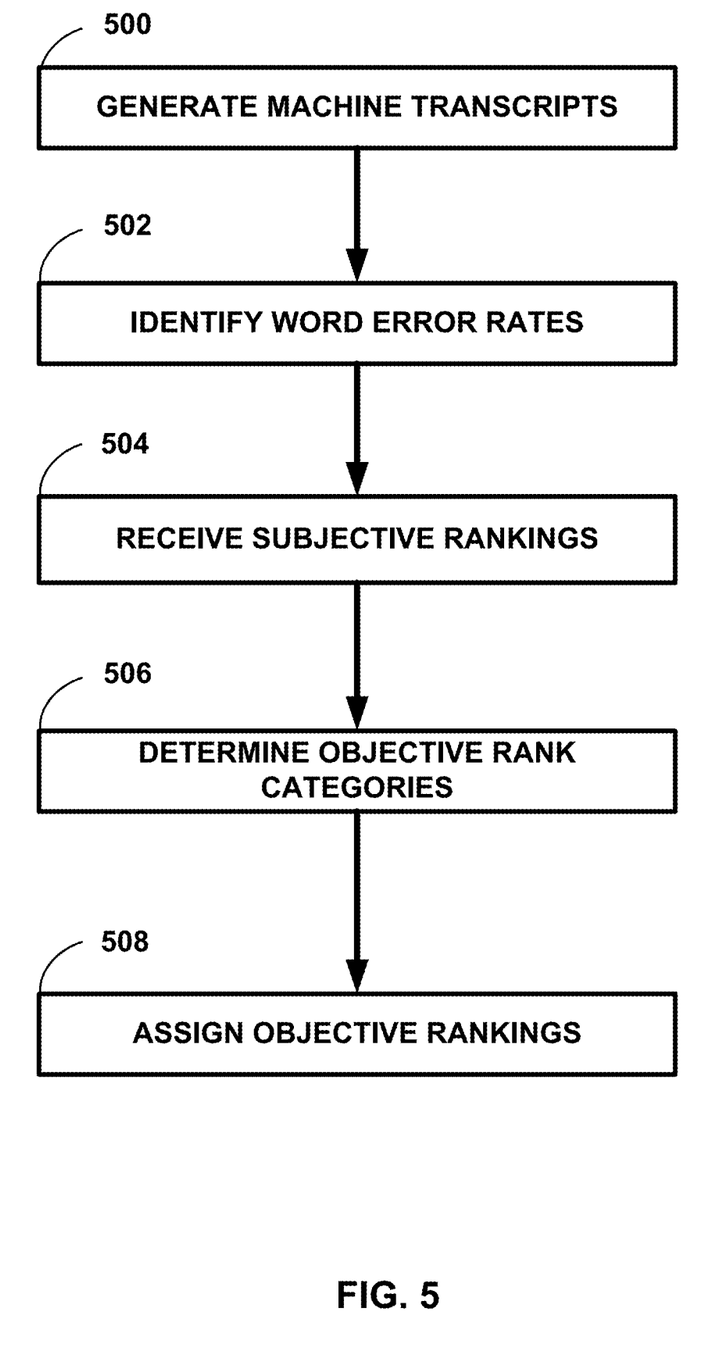
FIG. 5 is a flowchart illustrating another example operation of a computing system configured to evaluate an audio-transcription model, in accordance with the techniques of this disclosure.

FIG. 5 is a flow diagram illustrating operations performed by an example computing system in accordance with one or more aspects of the present disclosure. FIG. 5 is described below within the context of computing system 100 of FIG. 1. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, computing system 100 may generate a machine-generated transcript for each of a plurality of audio recordings (500). For instance, in some examples, a speech-recognition application (e.g., transcription model 202) of computing system 100 is configured to receive a first plurality of audio recordings 118A, or other audio data containing human speech, and automatically generate, for each audio recording 118A, a corresponding machine transcript 124A including textual data indicative of the human speech contained within the respective audio recording 118A.

Computing system 100 may identify, for each of the audio recordings, an error rate for each the machine-generated transcript (502). For instance, in some examples, computing system 100 receives manual transcripts 126A from SMEs 400 and compares machine transcripts 124A to manual transcripts 126A in order to determine an objective, quantitative, continuous key performance indicator ("continuous KPI") for each machine transcript 124A. For example, computing system 100 may compare machine transcripts 124A to reference transcripts 126A to determine a "word error rate" ("WER") 130A for each machine transcript 124A, wherein the WER 130A indicates a total percentage of incorrect or "missed" words within the respective machine transcript 124A, or equivalently, a ratio of missed or incorrect words in the machine transcript 124A to the total number of words within the corresponding reference transcript 126A.

In other examples, computing system 100 may receive the WERs 130A after they have been manually calculated by the human SMEs 400.

Computing system 100 may receive, for each of the machine-generated transcripts, a subjective ranking (504). For instance, in some examples, SMEs 400 receive machine transcripts 124A from computing system 100 and assign, to each machine transcript 124A, a subjective, qualitative, "categorical" key performance indicator ("categorical KPI"). For example, each SME 400 may subjectively evaluate the overall readability of each machine transcript 124A and assign a subjective ranking 128 selected from a predetermined, finite set of subjective rank categories 302A-302C. In one example, the subjective rank categories 302A-302C may include indications of whether each machine transcript 124A was a "good" quality transcription (302A), a "medium" quality transcription (302B), or a "bad" quality transcription (302C) of the speech contained within each audio recording 118A. In other examples, the categorical KPIs may include more, fewer, or different subjective rank categories 302. SMEs 400 input the subjective rankings 128 into computing system 100.

Computing system 100 may determine, based on the error rates and subjective rankings for the plurality of audio recordings, objective rank categories (506). For instance, in some examples, computing system 100 generates a set of data points 300A-300C, each datapoint including, for each machine transcript 124A, both (1) an objective, continuous KPI (e.g., a WER 130A) and (2) a corresponding subjective, categorical KPI (e.g., a subjective ranking 128). Computing system 100 then determines, based on datapoints 300 (including the objective WERs 130A and the subjective rankings 128), a set of objective criteria for qualitatively evaluating a subsequent or second set of audio recordings 118B. For example, computing system 100 may be configured to determine, based on the subjective rankings 128 and the WERs 130A, a set of objective, qualitative rank categories 308A-308C (collectively, "objective rank categories 308") defined by discrete (e.g., non-overlapping) ranges of word-error rates (WERs) 306A-306C (collectively, "error-rate ranges 308"). In other words, computing system 100 may be configured to select boundaries 304A, 304B (collectively, "error-rate boundaries 304") between error-rate ranges 306, wherein each error-rate range 306 corresponds to an objective, qualitative rank category 308.

In some examples in accordance with this disclosure, computing system 100 includes (e.g., is programmed with) a support vector machine ("SVM") application or module 206 ("SVM 206") configured to apply one or more support vector machine algorithms to datapoints 300. As used herein, SVM algorithms include any of a number of mathematical or computational techniques for selecting "optimal" boundaries between different groups of data.

For example, for two consecutive, non-overlapping (e.g., linearly separable) datasets (e.g., groups of datapoints), SVM algorithms may be configured to select a "hard" boundary that is some distance between the "support vector" datapoint from either dataset that is closest to the boundary. In other examples, such as for any two consecutive, overlapping datasets (e.g., datasets 300A and 300B, or datasets 300B and 300C, as shown in FIG. 3A), SVM algorithms may be configured to select a "soft" boundary 304 based on the distance between each datapoint and the boundary, and based on the number or ratio of datapoints from a common dataset falling on the "correct" side of the boundary.

Computing system 100 may assign, to a new machine-generated transcript of a new audio recording not included in the plurality of audio recordings, an objective ranking (508). For instance, after computing system 100 has selected the error-rate boundaries 304 between error-rate ranges 306 to define objective rank categories 308, computing system 100 may receive a subsequent or secondary set of audio recordings 118B or other audio data. Based on the second audio recordings 118B, speech-recognition and transcription model 202 generates a corresponding set of machine transcripts 124B.

SMEs 400 may also receive the same audio recordings 118B, and, for each audio recording 118B, manually generate a "manual" transcript 126B (or "reference" transcript 126B) of the respective audio recording 118B.

Computing system 100 may then identify a new set of word error rates (WERs). In some examples, computing system 100 receives manual transcripts 126B from SMEs 400 and compares machine transcripts 124B to manual transcripts 126B in order to determine an objective, quantitative, continuous KPI for each machine transcript 124B, such as a WER 130B for each machine transcript 124B. In other examples, computing system 100 receives WERs 130B after they have been manually calculated by the human SMEs 400.

Based on the WERs 130B, the previously defined error-rate ranges 306, and the corresponding objective rank categories 308, computing system 100 assigns, to each machine transcript, an objective ranking. As one non-limiting example using the example error-rate ranges shown in FIGS. 3A and 3B, computing system 100 might assign a machine transcript 124B having a WER 130B of 65% to an objective rank category 308C of "Bad." Computing system 100 may be configured to store the assigned objective rankings for further processing.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units or engines is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising processing circuitry and a storage device, wherein the processing circuitry has access to the storage device and is configured to:
    access a plurality of transcripts, each generated from a different audio signal of a plurality of audio signals;
    determine an error rate for each of the plurality of transcripts;
    determine, by a support vector machine application executing on the computing system and based on the error rate for each of the plurality of transcripts and subjective rankings of each of the plurality of transcripts, a plurality of objective categories, each corresponding to one of the subjective rankings and each associated with an error rate range, and wherein to determine the plurality of objective categories, the support vector machine application selects error rate boundaries between subjective rankings;
    determine an error rate for a new transcript of an audio signal not included in the plurality of audio signals; and
    assign one of the objective categories to the new transcript based on the error rate for the new transcript.

2. The computing system of claim 1, wherein to determine the error rate for each of the plurality of transcripts, the processing circuitry is further configured to:
  determine the error rate based on a percent of incorrect words relative to a reference transcript.

3. The computing system of claim 2, wherein to determine the error rate for each of the transcripts, the processing circuitry is further configured to:
  determine the error rate based on a weighting of relative importance of each of the incorrect words.

4. The computing system of claim 3, wherein the incorrect words are identified in a transcript of the plurality of transcripts, and wherein to determine the error rate based on a weighting of relative importance of each of the incorrect words, the processing circuitry is further configured to:
  evaluate a semantic meaning of each of the incorrect words relative to the transcript.

5. The computing system of claim 1, wherein the subjective rankings comprise a plurality of consecutive categories associated with progressively good transcript quality, and wherein to determine the plurality of objective categories, the support vector machine application:
  selects error rate boundaries between the consecutive categories of the subjective rankings.

6. The computing system of claim 5, wherein to select error-rate boundaries, the support vector machine application:
  selects an error rate boundary based on a difference between each error rate and the selected error rate boundary.

7. The computing system of claim 1, wherein to access the plurality of transcripts, the processing circuitry is further configured to:
  generate the plurality of transcripts.

8. A method comprising:
  accessing, by a computing system, a plurality of transcripts, each generated from a different audio signal of a plurality of audio signals;
  determining, by the computing system, an error rate for each of the plurality of transcripts;
  determining, by a support vector machine application executing on the computing system and based on the error rate for each of the plurality of transcripts and subjective rankings of each of the plurality of transcripts, a plurality of objective categories, each corresponding to one of the subjective rankings and each associated with an error rate range, and wherein to determining the plurality of objective categories includes the support vector machine application selecting error rate boundaries between subjective rankings;
  determining, by the computing system, an error rate for a new transcript of an audio signal not included in the plurality of audio signals; and
  assigning, by the computing system, one of the objective categories to the new transcript based on the error rate for the new transcript.

9. The method of claim 8, wherein determining the error rate for each of the plurality of transcripts includes:
  determining the error rate based on a percent of incorrect words relative to a reference transcript.

10. The method of claim 9, wherein determining the error rate for each of the transcripts includes:
  determining the error rate based on a weighting of relative importance of each of the incorrect words.

11. The method of claim 10, wherein the incorrect words are identified in a transcript of the plurality of transcripts, and wherein determining the error rate based on a weighting of relative importance of each of the incorrect words includes:
  evaluating a semantic meaning of each of the incorrect words relative to the transcript.

12. The method of claim 8, wherein the subjective rankings comprise a plurality of consecutive categories associated with progressively good transcript quality, and wherein determining the plurality of objective categories includes:
  selecting, by the support vector machine application, error rate boundaries between the consecutive categories of the subjective rankings.

13. The method of claim 12, wherein selecting error-rate boundaries includes:
  selecting, by the support vector machine application, an error rate boundary based on a difference between each error rate and the selected error rate boundary.

14. The method of claim 8, wherein accessing the plurality of transcripts includes:
  generating the plurality of transcripts.

15. Non-transitory computer-readable media comprising instructions that, when executed, cause processing circuitry of a computing system to:
  access a plurality of transcripts, each generated from a different audio signal of a plurality of audio signals;
  determine an error rate for each of the plurality of transcripts;
  determine, by a support vector machine application executing on the computing system and based on the error rate for each of the plurality of transcripts and subjective rankings of each of the plurality of transcripts, a plurality of objective categories, each corresponding to one of the subjective rankings and each associated with an error rate range, and wherein to determine the plurality of objective categories, the support vector machine application selects error rate boundaries between subjective rankings;
  determine an error rate for a new transcript of an audio signal not included in the plurality of audio signals; and
  assign one of the objective categories to the new transcript based on the error rate for the new transcript.

16. The non-transitory computer-readable media of claim 15, wherein the instructions that cause the processing circuitry to determine the error rate for each of the plurality of transcripts further include instructions that, when executed, cause the processing circuitry to:
  determine the error rate based on a percent of incorrect words relative to a reference transcript.

* * * * *